United States Patent [19]

Vats

[11] Patent Number: 4,892,413

[45] Date of Patent: Jan. 9, 1990

[54] SOUND AND VIBRATION REDUCING APPARATUS

[76] Inventor: Raj K. Vats, 11610 Perry Rd., Houston, Tex. 77064

[21] Appl. No.: 68,547

[22] Filed: Jul. 1, 1987

[51] Int. Cl.$^4$ ............... B01F 15/00; G10K 11/00
[52] U.S. Cl. ................................ 366/349; 181/200
[58] Field of Search ............... 366/349, 314, 347; 181/198, 200, 201, 202, 203, 204, 205, 224, 291, 294; 241/282.1, 282.2; 400/690.3, 690.4, 690, 690.1, 690.2; 312/229; 248/638, 673

[56] References Cited

U.S. PATENT DOCUMENTS

| | | | |
|---|---|---|---|
| 1,187,576 | 6/1916 | Waterhouse | 181/201 X |
| 2,041,845 | 5/1936 | Malickson | |
| 2,935,366 | 5/1960 | Cahn | 312/229 X |
| 3,044,715 | 7/1962 | Woodson et al. | |
| 3,276,539 | 10/1966 | Dear et al. | 181/204 |
| 3,548,280 | 12/1970 | Cockroft | 241/282.1 X |
| 3,747,735 | 7/1973 | Frick | 181/201 X |
| 3,789,954 | 2/1974 | Raleigh | |
| 3,881,569 | 5/1975 | Evans, Jr. | |
| 3,881,705 | 5/1975 | Greenspan | 241/282.1 X |
| 3,960,237 | 7/1976 | Sleeper | |
| 4,258,821 | 3/1981 | Wendt et al. | |
| 4,347,042 | 8/1982 | Holdsworth | 181/202 X |

FOREIGN PATENT DOCUMENTS

| | | |
|---|---|---|
| 1300299 | 6/1962 | France . |
| 294986 | 5/1964 | Netherlands . |
| 318217 | 11/1929 | United Kingdom ............. 248/673 |

OTHER PUBLICATIONS

Arent et al, IBM Technical Disclosure Bulletin, vol. 16, No. 1, Jun. 1973, pp. 298-299.

Primary Examiner—Harvey C. Hornsby
Assistant Examiner—Scott J. Haugland
Attorney, Agent, or Firm—Kenneth A. Roddy

[57] ABSTRACT

A sound and vibration reducing apparatus is disclosed. This apparatus has particular utility for use with electrical appliances such as blenders. In one embodiment of the invention, a two-piece base is adapted to substantially enclose the motor and control portion of the appliance. The base is lined with acoustical film to reduce the sound and vibration emanating from the appliance. A control system is disclosed which enables the appliance to be fully functional while completely enclosed within the apparatus. Finally, in a preferred embodiment, the apparatus includes an upper portion, preferably formed of transparent acoustical film, which is used to insulate the upper portion of the appliance. This transparent upper portion is easily removable from the appliance and also serves to deaden both the sound and vibration emanating from the appliance.

19 Claims, 2 Drawing Sheets

SOUND AND VIBRATION REDUCING APPARATUS

BACKGROUND OF THE INVENTION

The present invention relates generally to sound and vibration reducing structures and more particularly to sound and vibration reducing structures for enclosing small appliances such as blenders to reduce operating noise.

1. Field of the Invention

In the operation of many types of devices, and particularly small appliances such as blenders and the like, sound and vibrations are transmitted outwardly from such devices to the surrounding atmosphere. The noise and vibrations are found to be objectionable in some operating environments.

2. Description of the Related Art

There are several conventional techniques which can be adapted for use with a small appliance such as a blender to reduce noise. It is possible, for example, to place such an appliance in an acoustically insulated container. This technique, however, is frequently impractical and expensive. Moreover, it is generally impossible to operate or control the appliance while it is enclosed in the container. Such a solution is especially unsatisfactory in small appliances whose normal operation requires ready access to the appliances. Another significant disadvantage of the prior art techniques lies in the fact that the sound reducing housings are generally too bulky to be moved while a small appliance is completely enclosed in the housings.

It is desirable, then, to overcome these disadvantages by providing a housing to soundproof a device which may be a small appliance, such as a blender, while at the same time enabling the appliance to be operated without opening the housing or removing the appliance from the housing.

It is also desirable to have an enclosure that may be assembled and used with the appliance with a minimal degree of difficulty and inconvenience. Further, such an enclosure should in no way inhibit use of the appliance and should allow for viewing the operation of the appliance while it is being used. These problems have heretofore not been addressed by the prior art, but have been overcome by the present invention.

SUMMARY OF THE INVENTION

In a general aspect, the invention comprises a system for enclosing an appliance or device so as to reduce the noise generated by the apparatus, while at the same time enabling the appliance to be operated from outside the enclosure.

In a more specific aspect, the invention comprises a sound and vibration reducing apparatus which includes a rigid housing for surroundings the motor and control unit of an appliance, combined with a flexible insulating enclosure for a canister portion of an appliance. The flexible enclosure being removably connected to rigid housing surrounding the motor and control unit. The invention is designed to be effective over the frequency range of greatest noise, thereby reducing such noise frequencies to tolerable and acceptable levels.

The rigid motor and control unit housing may be comprised of an upper body and a base. The upper body may be removable from the base and is preferably hinged and latched to the base for ease of disassembly. The rigid housing further has a layer of insulation material bonded to its interior surfaces. Preferably, the layer of insulation material on the base includes a foam composite layer and a layer of waterproof film.

A number of buttons, levers, or other actuating devices, are operable through the upper body of the housing to operate the controls of the motor and control unit. The operating buttons or the like on the front of the motor and control unit may thereby be operated while the unit is completely enclosed within the housing. To assure that the unit is accurately positioned with respect to the housing, positioning means such as positioning rings may be mounted on the interior surface of the base.

Because the motor and control unit is completely operable while the appliance is enclosed within the housing, the appliance may be operated without opening up the structure. Release of undesirable noise into the environment is thereby greatly reduced.

The insulating canister enclosure of the invention preferably includes a flexible layer of transparent acoustical film for surrounding the canister, as well as a removable insulating canister cover. The resulting flexible insulating enclosure forms an acoustically tight unit with the upper body when placed in an opening through the top of the upper body.

DETAILED DESCRIPTION OF THE PREFERRED EMBODIMENT

Figure 1:
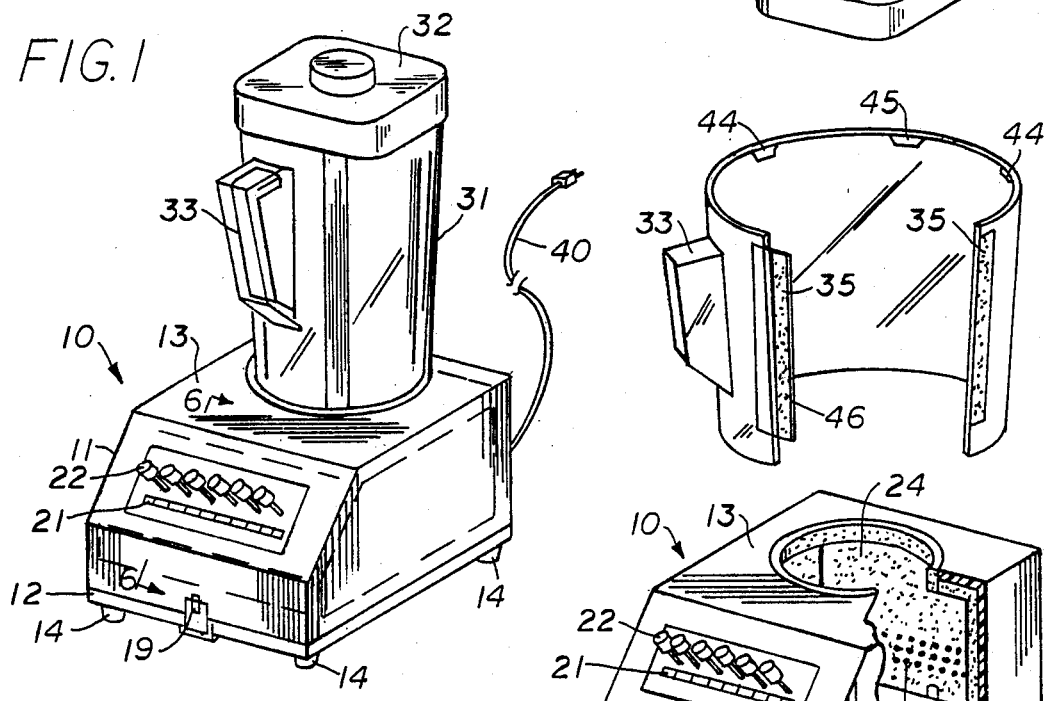
FIG. 1 is a perspective view of a sound and vibration apparatus according to a preferred embodiment of the present invention.

A preferred embodiment of the present invention comprises a motor and control unit housing 10 and a flexible insulating enclosure 31 as shown in FIG. 1. The motor and control unit housing 10 includes a base 12 removably attached to a rigid upper body 11. The base 12 has legs 14 for secure mounting on a flat surface. During operation, an appliance such as a blender may be completely enclosed within the motor and control unit housing 10 and flexible insulating enclosure 31. To operate the appliance while it is enclosed, a control panel 21 is provided with slidable control buttons, or levers, 22 which are used to actuate the controls of the appliance. Power supply to the appliance is through the power supply cord 40 as shown in FIG. 1. To secure base 12 to the upper body 11 there is provided a latch 19 and slip-on hinge 37 (shown particularly in FIG. 3).

Figure 2:
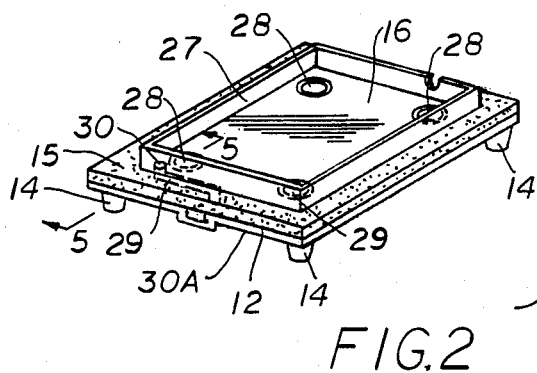
FIG. 2 is an exploded perspective view of the sound and vibration reducing apparatus of FIG. 1.

Refering to FIGS. 1 and 2, the flexible insulating enclosure 31 includes a canister lid handle insulator 33 and an insulating canister cover 32 and flexible insulating enclosure supports 44 and 45. The flexible canister enclosure 31, is preferably made of a transparent acoustical film. This flexible enclosure 31 wraps around the body of a canister and is contoured to accommodate surfaces such as the handle insulator 33 projecting outwardly from the upper portion of the canister. The enclosure supports 44 and 45 align with the upper edge of the canister and provide support to the enclosure so as to keep it in position. The enclosure supports 44 are made of a fine strip of rigid material imbedded in shallow slits made on the sides of the transparent acoustical enclosure 31. The enclosure support 45 is formed from a broad strip of rigid material attached to the side of the transparent acoustical enclosure 31 around the area where the spout of the canister may fall, when the transparent acoustical enclosure 31 is wrapped around the canister. The enclosure support 45 is thick enough to allow even flow of the canister contents when poured. The enclosure supports 44 and 45 also help in aligning the transparent acoustical enclosure 31 when it is wrapped around the canister. The flexible canister cover 31 may be one or more layers of transparent acoustical film so that the contents of the canister are visible. The canister lid cover 32 may also be made of one or more layers of transparent acoustical film. To assure an acoustically tight fit between the insulating enclosure 31 and the rigid upper body 11 there is a canister opening 24 in the top surface 13 of the rigid upper body 11. In a preferred embodiment of the invention, the canister opening 24 is lined with a closed cell acoustical foam or similar acoustical padding. When the enclosure 31 encloses a canister of an appliance, the canister opening 24 conforms to the outer dimensions of the enclosure 31.

FIG. 2 is an exploded perspective view of the apparatus of FIG. 1. As shown, the base 12 has legs 14 and a layer of insulating material 15. In order to position an appliance such as a blender on the base, positioning means, such as rings 28, are preferably provided. The insulating material 15 further includes a waterproof film layer 16. To prevent liquid and sound leakage there is a rim 27 surrounding the waterproof film layer 16. The rim 27 has a dual function. First, the rim 27 combines with the waterproof film layer 16 to form an enclosure to catch any liquids that might drip from the appliance or similar device. Second, the rim 27 fits snugly with the insulating material 23 on the side walls to prevent any sound leakage. To allow drainage of excess fluids through the base 12, a drain passage 29 is provided with an entrance end 30 and an exit end 30A. Preferably the entrance end 30 is staggered or angled from the exit end 30A so that minimal noise is transmitted into the operating environment.

The insulating material 15 forms a layer of padding in between the rigid upper body 11 and base 12 to form a tight enclosure joint. The padding 15 helps to absorb vibrations from both the rigid upper body 11 and base 12 when the rigid upper body 11 and base 12 are joined together. The padding also fills into any minute imperfections in the joining surfaces.

Figure 8:
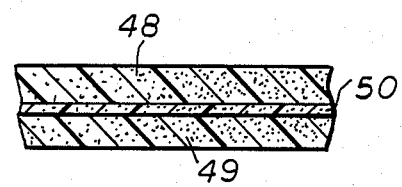
FIG. 8 is a cross section view of an acoustical composite lining.

Insulating material 23 is bonded to the side walls, to the interior and to the top 13 of the rigid upper body. As shown in FIG. 8, the insulating layer 23 is preferably an acoustical composite lining made of open cell acoustical foam 48, 49 on both sides of a vinyl film barrier 50. One of the exposed sides of the foam insulating layer 23 is preferably embossed to provide higher sound absorption and an increased resistance to mechanical abrasion. In this embodiment, the embossed side faces out, toward the appliance.

The upper body 11 is also provided with slidable control buttons, or levers, 22 marked by a control panel 21. There is a canister opening 24 in the top 13 of the upper body to provide easy access to the top of a motor and control unit and to allow for removability of a canister from the motor and control unit. The flexible insulating enclosure 31 also is shown in FIG. 2, removed and unattached to a canister. The canister handle insulator 33 is provided to assure an acoustically tight fit. The flexible insulating enclosure 31 may be wrapped about an appliance canister such as a blender canister and fastened with fastening strips 35 as shown in FIG. 2. The fastening means on the flexible insulating enclosure may be VELCRO or similar such quickly attachable material. One of the fastening strips 35 is attached to the flap 46. The flap 46 is preferably made of transparent acoustical film. Flap 46 helps to align the two edges of the transparent acoustical enclosure 31. Flap 46 also helps to block any sound energy leakage in between the two edges of the transparent acoustical enclosure 31. An insulating canister cover 32 also is provided to enclose the top of the flexible insulating enclosure 31. The insulating canister cover 32 has a canister cover opening 34 so that it may be securely received over the knob at the top of a canister lid. In a preferred embodiment of the invention, the canister cover opening 34 is lined with closed-cell acoustical foam or similar acoustical padding to assure an acoustically tight fit between the insulating canister cover opening 34 and the knob on the canister lid.

Figure 3:
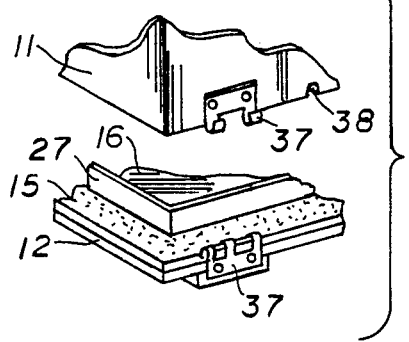
FIG. 3 is an exploded perspective view of the hinge mechanism used to secure the base and upper body shown in FIGS. 1 and 2.

Now referring to FIG. 3, a section of the base 12 and rigid upper body 11 are shown. The base 12 has a layer of insulating material 15 as shown and a waterproof film layer 16 inside the rim 27 which forms a perimeter surrounding the enclosed appliance, which may be a blender or the like. The rigid upper body 11 further have an electrical input opening 38 for access to the power supply cord 40 to an appliance. A hinge 37 is provided between the base 12 and the rigid upper body 11 so that the housing may be opened and disassembled. Preferably the hinge 37 is a slip-on type so that the upper body 11 may be completely removed from the base 12.

Figure 4:
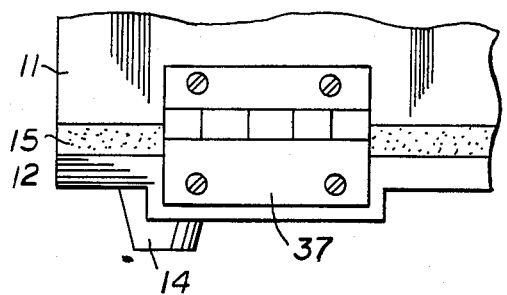
FIG. 4 is a rear view of the hinge mechanism of FIG. 3.

FIG. 4 shows the slip-on hinge 37 in greater detail. As shown the base 12 has legs 14, and the rigid upper body 11 is removably hinged to the base 12. A layer of insulating material 15 is shown on the base 12.

Figure 5:
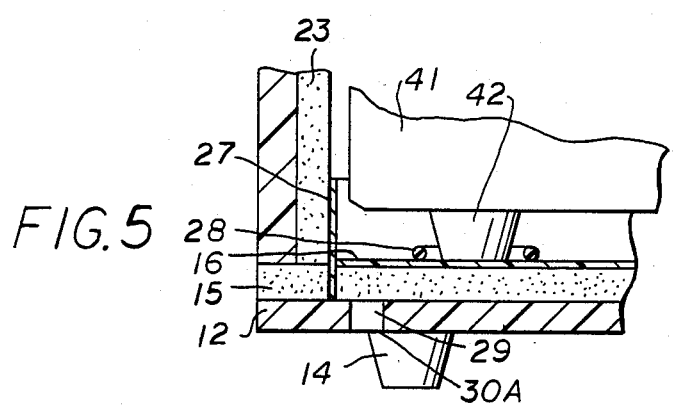
FIG. 5 is a cross section view of the base and positioning ring shown in FIG. 2 for positioning a motor control unit within the housing.

In FIG. 5, a positioning ring 28 is shown. As shown, the base 12 has legs 14 and an insulating foam layer 15. The rim 27 forms a perimeter around the bottom of an appliance, such as a blender. Inside the rim area is a waterproof film layer 16 overlaying the insulating material 15. One or more positioning rings 28 serve to position the motor and control unit legs 42 of an appliance. The positioning rings 28 assure that selected slidable control buttons or levers on the front of the upper body 11 correspond directly to the operating buttons on the appliance. Therefore, it is crucial that the positioning rings 28 be accurately positioned so that the legs of the appliance coact to substantially center the appliance within the enclosure.

The proper positioning of the appliance's motor and control unit is very important to achieve a high degree of sound and vibration control. This positioning is achieved by rings 28, hinges 37, latch 19, and part of the appliance's motor and control unit body fitting snugly with the insulating material 23.

Positioning is very important so that the slidable control buttons, or levers, 22 communicate directly with the controls 43 of the appliance. Also, positioning is critical so that the top flexible insulating enclosure 31 will alow the canister to align with the motor and control unit of the appliance through the canister opening 24.

Also shown in FIG. 5 is a drain passage 29 having an entrance end 30 (shown in FIG. 2), and an exit end 30A. Preferably the entrance end 30 is staggered or angled with respect the exit end 30A so that minimal noise is transmitted to the operating environment.

As shown in FIG. 2, ventilating holes 26 are preferably provided in the rigid upper body. In a preferred embodiment, the inside end and the outside end of the ventilating holes 26 are staggered or angled so that minimal noise escapes from the housing into the operating environment.

Figure 6:
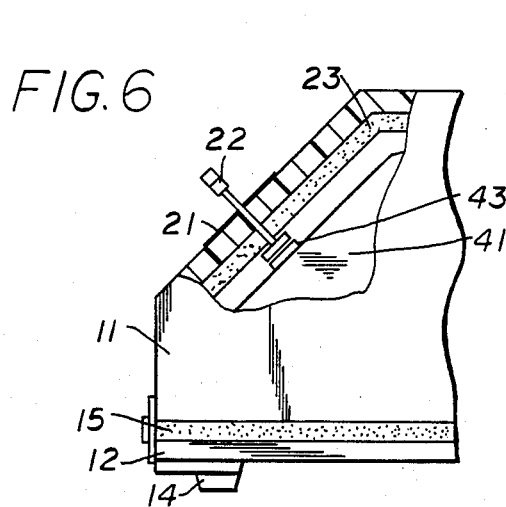
FIG. 6 is a cross section view of the actuating controls shown in FIGS. 1 and 2.

Referring to FIG. 6, a cross section of the operating control system is shown. The selectable control buttons, or levers, 22 may be slidable into, and out of, the control panel 21 through openings in the front of the rigid upper body 11. As can be seen in FIG. 6, the slidable control buttons or levers 22 communicate with the buttons 43 on the front of a control panel of an appliance motor and control unit 41. Because of the accurate positioning of the positioning rings 28, as shown in FIG. 5, the control buttons or levers 22 correspond directly to the controls 43 of the appliance. The appliance may thereby be operated while remaining completely enclosed and soundproofly secured inside the housing.

Figure 7:
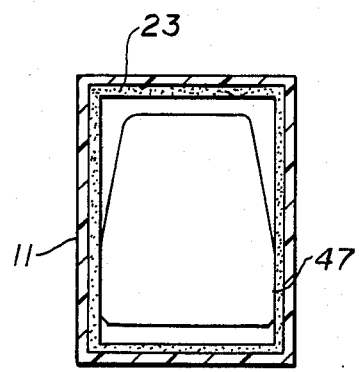
FIG. 7 is a cross section view of the upper rigid body shown in FIG. 6.

Referring to FIG. 7, a cross section of the upper rigid body 11 is shown. The motor and control unit body fits snugly with the insulating material 23 at 47 as can be seen in FIG. 7. This positions the appliance's motor and control unit relative to the rigid upper body 11. Also, the motor and control unit are held firmly in place to absorb vibrations emanating from the motor and control unit.

It is contemplated within the present invention that a variety of different actuating means may be used to operate the controls of an appliance or similar device. Therefore, it is possible that various different switches or buttons such as the slidable control means shown may be used to operate an appliance while it remains enclosed within the soundproof housing.

It also will be understood that the insulating material not only helps to prevent excessive noise transmitted from the motor and control unit but also helps to dampen vibrations. Additionally, as shown in FIG. 5, the insulating foam layer 15 combined with a waterproof film layer 16 prevents leakage from damaging the base of a sound and vibration reducing apparatus.

The present invention provides full functionality of an appliance when it is completely enclosed within a soundproof housing. A primary advantage of the present invention, therefore, is operability of the appliance with ease while the appliance remains enclosed within the housing. The present invention also is very lightweight and compact. Another advantage of the present invention is that it provides a soundproof enclosure that may be frequently dismantled and reassembled in a short amount of time. The present invention therefore adds a new dimension to the use of appliances such as blenders and the like by significantly reducing their sound and vibration levels. The invention can be used in household blenders and any other devices that use similar motor and control units and/or canisters and where there is a need to reduce the sound and vibration levels.

Although variations in the embodiment of the present invention may not each realize all of the advantages of the invention, certain features may become more important than others in various applications of the device. The invention accordingly should be understood to be limited only by the scope of the appended claims.

What is claimed is:

1. A sound reducing enclosure for electric blenders and other appliances of the type having a motor within a housing, a liquid containing canister removably received on the motor housing, a canister lid, and motor control buttons extending through the appliance housing for manual operation of the appliance, said sound reducing enclosure comprising;

a generally flat rigid base member having a bottom surface with legs depending therefrom for supporting it on a flat surface and a top surface covered by a layer of sound insulating material having a centrally disposed waterproof portion peripherally surrounded by a raised rim to prevent liquid from leaking from the waterproof portion, positioning means within the raised rim of said base member corresponding with the legs of the appliance for removably receiving and positioning the appliance on said base member, a rigid upper body member removably hinged to said base member and having a top wall and side walls configured to substantially surround and enclose the appliance motor housing when positioned on said base member and an opening in the top wall for allowing the appliance canister to be removably received on the appliance motor housing, a layer of sound insulating material lining the interior surfaces of said upper body member, and one or more manipulating devices extending movably through one of said upper body side walls in alignment with the motor control buttons on the appliance housing for operatively engaging the buttons for manual operation of the appliance when it is positioned on said base member and substantially enclosure by said upper body member, the sound insulating material of said base member and said upper body member substantially surrounding the appliance motor housing when enclosed thereby to absorb the sound and vibration emanating from the appliance and the waterproof portion and raised rim of said base member preventing leakage of liquid from the enclosure.

2. The sound reducing enclosure according to claim 1 wherein
said base member and said upper body member layer of sound insulating material comprises open-cell acoustical foam.

3. The sound reducing enclosure according to claim 2 wherein
said base member waterproof portion comprises an outer layer of waterproof film covering said open-cell acoustical foam.

4. The sound reducing enclosure according to claim 2 wherein
said upper body member layer of sound insulating material comprises open-cell acoustical foam on both sides of a layer of vinyl film.

5. The sound reducing enclosure according to claim 1 wherein said positioning means on said base member comprise a plurality of rings mounted on the waterproof portion of said layer of sound insulating material in alignment with the legs of the appliance.

6. The sound reducing enclosure according to claim 1 wherein
said manipulating devices comprise lever members slidably mounted on said side wall and manually movable into and out from said side wall to selectively engage or disengage the corresponding motor control buttons on the appliance housing.

7. The sound reducing enclosure according to claim 1 including
latch means operatively connected between said base and said upper body to secure said upper body to said base and provide an acoustically tight union therebetween.

8. The sound reducing enclosure according to claim 1 including
a drain passage extending through said base member and having an entrance opening on the top surface within the raised rim thereof and an exit opening on the bottom surface thereof laterally staggered from the entrance opening to allow drainage of excess liquids from said base member and minimal noise transmission through said passage.

9. The sound reducing enclosure according to claim 1 including
a plurality of vent holes extending angularly through said upper body member side wall for ventilating the interior of the enclosure while allowing minimal noise transmission therethrough.

10. The sound reducing enclosure according to claim 1 including
an opening through said upper body member side wall for receiving the electric cord of the appliance.

11. The sound reducing enclosure according to claim 1 wherein;
the opening in the top wall of said upper body member is lined with closed-cell acoustical foam.

12. The sound reducing enclosure according to claim 1 including;
a generally cylindrical canister enclosure member having an open top and bottom end and a side wall configured to encircle and support the appliance canister,
said canister enclosure bottom end configured to be slidably received within the opening on said upper body top wall when the appliance canister is received on the motor housing and provide an acoustically tight union with said upper body, and
a lid cover member having a top wall and side walls configured to be slidably received on the open top end of said canister enclosure and substantially enclose the lid of the appliance canister when installed thereon,
said base member, upper body member, canister enclosure, and cover member forming a complete enclosure surrounding the appliance motor housing and appliance canister.

13. The sound reducing enclosure according to claim 12 wherein
the appliance canister has an outwardly projecting handle intermediate each end and a pouring spout at its upper end, and
said canister enclosure member side wall is configured to receive the outwardly projecting handle and pouring spout.

14. The sound reducing enclosure according to claim 13 wherein
said canister enclosure member is formed of transparent acoustical insulating material.

15. The sound reducing enclosure according to claim 13 wherein
said canister enclosure member side wall is formed of flexible material having a cavitated portion adapted to receive the outwardly projecting canister handle and side portions extending laterally therefrom to encircle the appliance canister with opposed separable edges adapted to be releasably fastened together in the encircled configuration.

16. The sound reducing enclosure according to claim 15 wherein
each opposed separable edge of said canister enclosure member side wall has a fabric hook and loop fastener strip secured thereto to form releasably interlocking strips along the opposing longitudinal edges for releasably securing said canister enclosure in the encircled configuration.

17. The sound reducing enclosure according to claim 15 including
support means on said canister enclosure member top end for receiving and supporting the top end of the appliance canister and its pouring spout in the encircled configuration whereby the appliance canister and surrounding canister enclosure may be lifted as a single unit from the motor housing and the contents thereof poured through the spout.

18. The sound reducing enclosure according to claim 12 wherein
the top wall of said lid cover has an opening therethrough to slidably receive the knob of the appliance canister lid.

19. The sound reducing enclosure according to claim 18 wherein
the opening in said lid cover is lined with closed-cell acoustical foam.

* * * * *